(12) United States Patent
Shimmo et al.

(10) Patent No.: US 6,530,554 B2
(45) Date of Patent: *Mar. 11, 2003

(54) MOLDING DIE FOR USE WITH A SOL-GEL COMPOSITION

(75) Inventors: Katsuhide Shimmo, Osaka (JP); Kenichi Nakama, Osaka (JP); Isao Muraguchi, Osaka (JP)

(73) Assignee: Nippon Sheet Glass Co, Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/556,325

(22) Filed: Apr. 24, 2000

(65) Prior Publication Data

US 2003/0025225 A1 Feb. 6, 2003

(30) Foreign Application Priority Data

Apr. 26, 1999 (JP) .......................................... 11-118709
Sep. 30, 1999 (JP) .......................................... 11-278739

(51) Int. Cl.[7] .................................................. B29C 33/56
(52) U.S. Cl. .................... 249/115; 425/436 R; 425/810
(58) Field of Search ............................ 425/436 R, 810; 249/115; 264/338

(56) References Cited

U.S. PATENT DOCUMENTS

| | | | |
|---|---|---|---|
| 3,629,388 A | * 12/1971 | Wolf et al. | .................. 264/219 |
| 4,482,511 A | * 11/1984 | Komatsubara | ............... 264/483 |
| 5,188,863 A | * 2/1993 | de Graaf et al. | ............. 427/512 |
| 5,436,764 A | * 7/1995 | Umetani et al. | ............ 359/566 |
| 5,623,375 A | * 4/1997 | Floch et al. | ................. 359/871 |
| 6,231,243 B1 | * 5/2001 | Zhang et al. | ................ 385/137 |

OTHER PUBLICATIONS

Patent Abstracts of Japan, vol. 015, No. 198, May 22, 1991 (JP 03 049057 A).
Patent Abstracts of Japan, vol. 015, No. 144, Apr. 11, 1991 (JP 03 019154 A).
Patent Abstracts of Japan, vol. 015, No. 198, May 22, 1991 (JP 03 049076 A).

* cited by examiner

*Primary Examiner*—Jan H. Silbaugh
*Assistant Examiner*—Donald Heckenberg
(74) *Attorney, Agent, or Firm*—Sughrue Mion, PLLC (57) ABSTRACT

A molding die having satisfactory releasability, a sol-gel composition produced using the molding die, and a process for producing a sol-gel composition. The molding die which is to be pressed against a sol-gel material for producing a sol-gel composition has a release film, e.g., a thin gold (Au) film, formed on the molding surface of the molding die through a buffer layer made of metals and/or inorganic oxides.

4 Claims, 3 Drawing Sheets

MOLDING DIE FOR USE WITH A SOL-GEL COMPOSITION

FIELD OF THE INVENTION

The present invention relates to a molding die, a sol-gel composition produced using the die, and a process for producing a sol-gel composition. More particularly, the invention relates to a molding die applicable to the production of various optical parts such as read-only optical information recording media (CD-ROM), flat microlenses and grating elements, a sol-gel composition produced using the die and a process for producing the sol-gel composition.

BACKGROUND OF THE INVENTION

A sol-gel method is used to produce various optical parts such as read-only optical information recording media (CD-ROM), flat microlenses and grating elements. This method comprises applying a sol-gel material in a given thickness to a given substrate, pressing a molding die having a given surface shape against the sol-gel material for a given period of time with heating, subsequently separating the molding die from the sol-gel material, and then sintering the sol-gel material to evaporate a solvent, thereby obtaining a sol-gel composition having a desired surface shape and a desired thickness.

In order for the sol-gel method to obtain a sol-gel composition at a higher rate while attaining a reduced rejection rate and improved dimensional accuracy of the sol-gel composition, it is essential to use a molding die having satisfactory releasability from the sol-gel material.

Because of this, the molding dies for use in the sol-gel method have hitherto been made of a suitable resin so as to obtain satisfactory releasability from sol-gel materials.

However, a molding die having even better releasability is desired because the sol-gel method has recently come to be required to attain a higher rate of production, a lower rejection rate, and better dimensional accuracy than conventional ones.

SUMMARY OF THE INVENTION

The present invention has been achieved in order to satisfy the demand.

Accordingly, one object of the invention is to provide a molding die having satisfactory releasability.

Another object of the invention is to provide a sol-gel composition produced using the molding die.

Still another object of the present invention is to provide a process for producing the sol-gel composition.

In order to accomplish these objects, the present invention provides a molding die to be pressed against a sol-gel material for producing a sol-gel composition, the molding die having a release film formed on the molding surface thereof to be brought into contact with the sol-gel material.

The release film may be made of any material as long as it has desired properties including: satisfactory releasability from the sol-gel material; a given strength which enables the release film to withstand the pressing pressure applied to the sol-gel material; heat resistance which enables the release film to withstand the heat applied to the sol-gel material; corrosion resistance which enables the release film not to corrode even upon repeated contact with the sol-gel material; and moldability which enables the material to be easily molded into a desired shape. Examples of the material include gold (Au), platinum (Pt), copper (Cu), palladium (Pd), silver (Ag), nickel (Ni), and alloys of two or more thereof.

Since the molding die has such a release film on the molding surface thereof, it shows satisfactory releasability from the sol-gel material in producing a sol-gel composition. As a result, a higher production rate, a lower rejection rate and better dimensional accuracy than conventional ones can be attained.

In a preferred embodiment of the invention, the release film is made of a material comprising one member selected from the group consisting of gold (Au), platinum (Pt), copper (Cu), palladium (Pd), silver (Ag), nickel (Ni) and alloys of two or more thereof.

These materials may be used alone or in combination of two or more thereof as the release film as long as the desired effects are obtained. The release film is not particularly limited in thickness, molding method, etc. The alloys usable as the material of the release film each need not made of all those metals and may be made of two or more of the metals. Where the release film is made of an alloy, the constituent metals may be in any desired proportion.

Since the molding die according to this preferred embodiment has a release film made of a material comprising one member selected from the group consisting of gold (Au), platinum (Pt), copper (Cu), palladium (Pd), silver (Ag), nickel (Ni) and alloys of two or more thereof, the molding surface is unsusceptible to oxidation and is less apt to suffer a change with the lapse of time. As a result, excellent durability is obtained.

In another preferred embodiment of the invention, the die has a substrate for the release film, and the substrate is made of a material comprising one member selected from the group consisting of resins, glasses, metals, and a combination of two or more thereof bonded to each other.

The substrate used may be a suitable material which has the same performances as the release film and has a coefficient of thermal expansion close to that of the release film.

In the molding die according to the preferred embodiment described above, the release film can have a reduced thickness irrespective of the area of the molding surface. Where the substrate is made of a resin, this molding die has an advantage that the substrate material can be finely processed easily and has satisfactory moldability. On the other hand, where the substrate is made of a glass or metal, the substrate has high heat resistance, high strength and excellent durability.

In a further preferred embodiment of the invention, the molding die has a buffer layer made of one or more metals and/or one or more inorganic oxides between the substrate and the release film.

Since the molding die according to the embodiment described above has a buffer layer made of, e.g., aluminum (Al) chromium (Cr) or a tin-doped indium oxide (ITO), between the release film and the substrate, the release film is tenaciously deposited on the substrate through the buffer layer. Namely, compared to molding dies having a release film directly deposited on a substrate, this molding die is less apt to have the possibility that the release film may peel off the substrate, i.e., may be transferred to a sol-gel material. As a result, the molding die can have improved durability.

In still a further preferred embodiment of the invention, the surface of the release film has recesses. These recesses conform with the surface shape of the substrate.

Examples of the shape of each recess include a sphere, cones, pyramids and grooves having any desired cross-sectional shape. Spherical, conical or pyramidal recesses may be formed in a desired number in part or all of the release film surface. Where many such recesses are formed, there are no particular limitations on the relative position thereof. On the other hand, where grooves are formed as recesses, the grooves may be linear or curved and may be formed in a desired number. When grooves are formed, they may be arranged concentrically or in a lattice pattern.

Since the molding die according to the embodiment described above has recesses formed in the surface of the release film, it is possible to produce various optical parts, e.g., read-only optical information recording media (CD-ROM), planar microlenses and grating elements, which have high dimensional accuracy.

The invention further provides a sol-gel composition molded by pressing any of the molding dies according to the invention described above against a sol-gel material.

Since this sol-gel composition is molded with the molding die having a release film formed on the molding surface, a higher production rate, a lower rejection rate and better dimensional accuracy than conventional ones can be attained.

The invention still further provides a process for producing a sol-gel composition which comprises using the sol-gel composition described above as a molding die to be pressed against a sol-gel material.

Since the sol-gel composition thus molded has higher dimensional accuracy than conventional ones, a high precision replica can be obtained.

In a preferred embodiment of the process for producing a sol-gel composition of the invention, the sol-gel composition used as a molding die has functional groups which are releasable from the sol-gel material.

Examples of the functional groups include relatively lowly reactive groups such as methyl, ethyl, isopropyl, 3,3,3-trifluoropropyl and phenyl groups.

According to the preferred embodiment of the process for producing a sol-gel composition, the sol-gel composition for use as a molding die has satisfactory releasability from the release film because the functional groups form an outer layer of the sol-gel composition upon contact with the release film. Consequently, the sol-gel composition can be used as a die for molding a sol-gel material without essentially necessitating a release film made of, e.g., platinum (Pt) or gold (Au).

BRIEF DESCRIPTION OF THE DRAWINGS

FIG. 2 is a diagrammatic sectional view illustrating the die and a sol-gel composition.

DESCRIPTION OF REFERENCE NUMERALS

10 Die
11 Replica-molding die (sol-gel composition)
13 Substrate
14 Molding surface
15 Release film
16 Groove
18 Buffer layer

DETAILED DESCRIPTION OF THE INVENTION

Embodiments of the invention will be explained in detail below by reference to the accompanying drawings.

Figure 1:
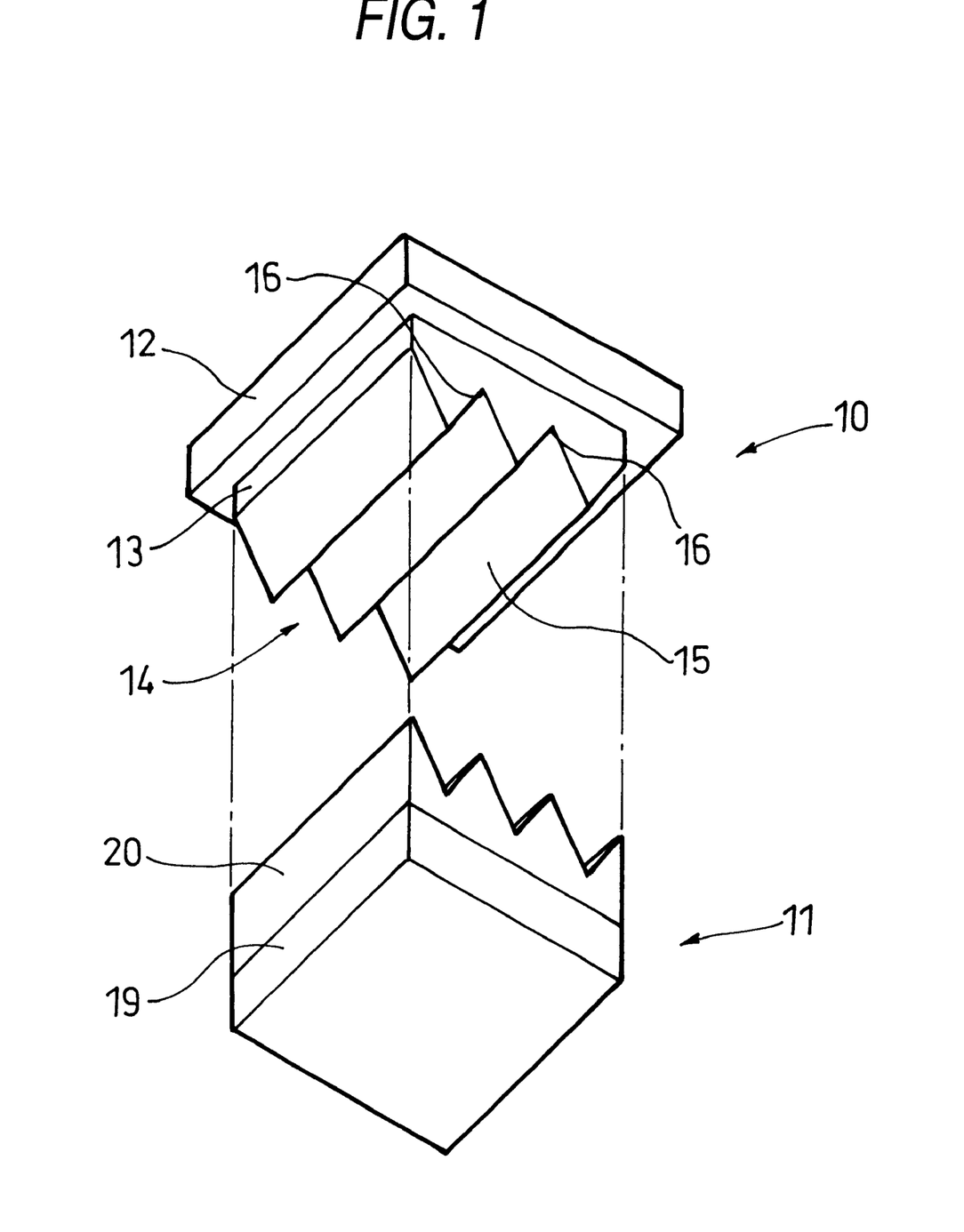
FIG. 1 is a slant view illustrating an embodiment of the die according to the invention.

FIG. 1 shows a molding die 10 as an embodiment of the invention. This molding die 10 is used as (1) a die for producing various optical parts such as read-only optical information recording media (CD-ROM), flat microlenses and grating elements. The molding die 10 is also used as (2) a master die, i.e., a model, for producing a replica-molding die 11 from a sol-gel material; the replica-molding die 11 is used for producing those optical parts.

The embodiment of the invention will be explained in detail below mainly with respect to its use as the master die (2) as an example.

for use in producing a replica-molding die 11 which is a sol-gel composition, the molding die 10 comprises a platy base 12 to be supported by a pressing machine (not shown), a substrate 13 fixed the lower side of the base 12, and a release film 15 formed on the molding surface 14 of the substrate 13.

The substrate 13 is made of a material comprising one member selected from resins, glasses, metals and a combination of two or more thereof bonded to each other. Specific examples thereof include materials having a coefficient of thermal expansion close to those of the release film 15 and the sol-gel composition, such as epoxy resins, quartz glass, aluminum (Al), silver (Ag), chrome steel (SUS), copper (Cu) alloys including brass, nickel (Ni) alloys, and silicon (Si).

Where a resin such as an epoxy resin is employed as the substrate 13, this substrate has better processability than substrates made of a glass or metal. Where a glass or metal, such as quartz glass, aluminum (Al), silver (Ag), chrome steel (SUS) or a copper (Cu) alloy, e.g., brass, a nickel (Ni) alloy or silicon (Si), is employed as the substrate 13, this substrate has better strength and heat resistance than resinous substrates. When the substrate 13 is made of an epoxy resin, the base is preferably made of a material such as a glass or metal so that the substrate 13 can withstand the heat and pressure to be applied in molding a sol-gel material.

This substrate 13 has grooves 16 as recesses in the molding surface 14 facing the replica-molding die 11. These grooves 16 have the same shape with a nearly V-shaped cross section, and are arranged in parallel with each other.

Figure 2:
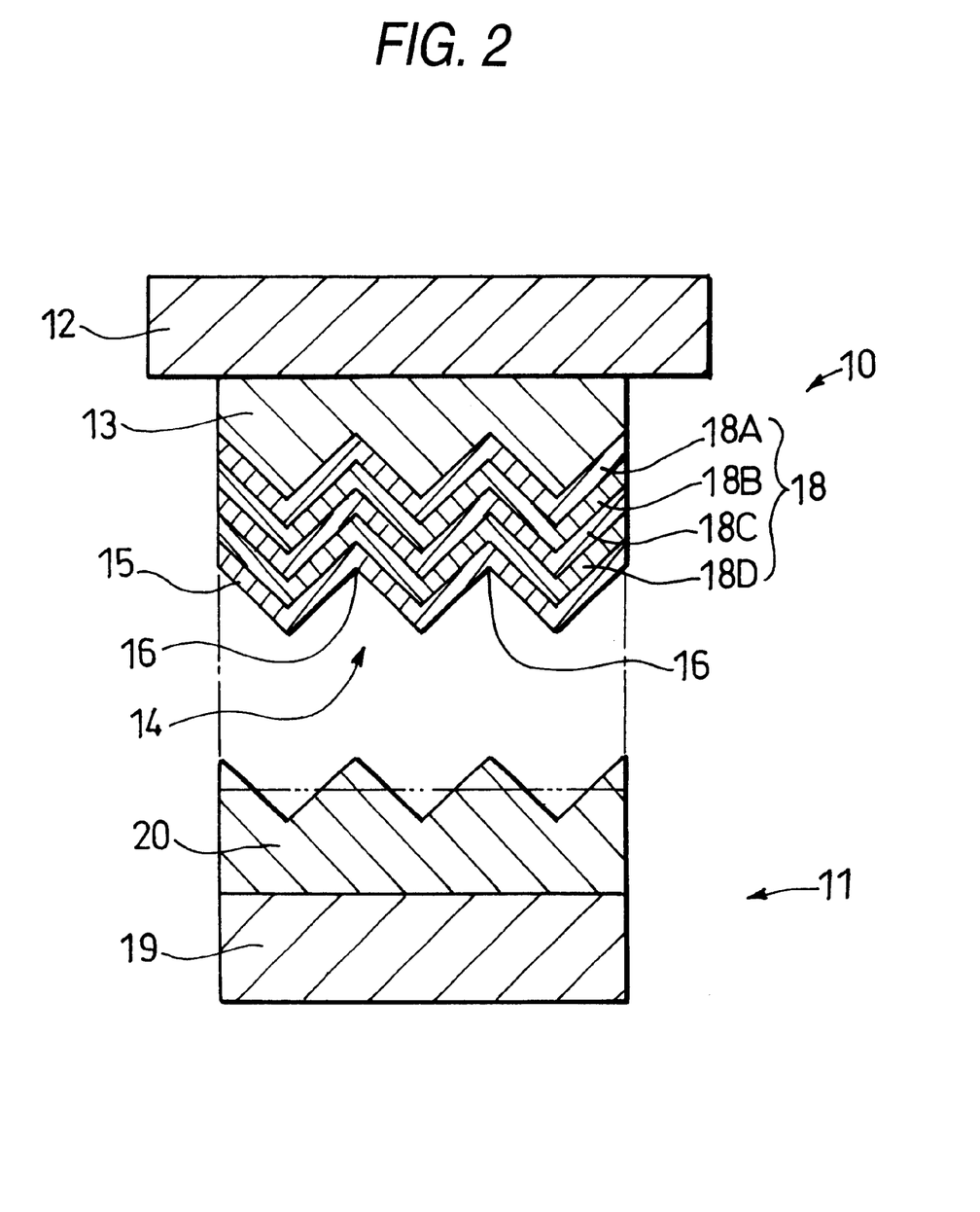

As shown in FIG. 2, this substrate 13 has a buffer layer 18 made of one or more metals and inorganic oxides over the whole area corresponding to the molding surface 14.

Examples of materials of the buffer layer 18 include aluminum (Al), chromium (Cr) and a tin-doped indium oxide (ITO). The buffer layer 18 is deposited in a predetermined even thickness over the area corresponding to the molding surface 14, and has a single- or multilayer structure. (The buffer layer 18 preferably has a single-layer structure having a thickness of from 10 to 50 nm. However, the structure of the buffer layer in the invention should not be construed as being limited to such a single-layer structure.)

The buffer layer 18 shown in FIG. 2 has a multilayer structure composed of an aluminum (Al) layer 18A having a thickness. of 100 nm, a silica ($SiO_2$) layer 18B having a thickness of 280 nm, a titania ($TiO_2$) layer 18C having a thickness of 170 nm and a layer 18D having a given thickness made of chromium (Cr) or a tin-doped indium oxide (ITO).

The release film 15, which has been formed on the outermost layer of the buffer layer 18, is made of, for example, gold (Au), platinum (Pt), copper (Cu), palladium (Pd), silver (Ag), nickel (Ni) or an alloy of two or more of these. The release film 15 is preferably one formed by sputtering so as to have an even thickness and a smooth surface, because the smoother the surface thereof, the higher the releasability. Especially preferred materials of the release film 15 from the standpoint of heat and corrosion resistance are gold (Au) and platinum (Pt). Where gold (Au) or platinum (Pt) is used, it is preferred to employ chromium (Cr) or a tin-doped indium oxide (ITO) as the buffer layer 18 from the standpoint of adhesion of the release film 15 to the substrate 13.

On the other hand, as shown in FIGS. 1 and 2, the replica-molding die 11 is formed from a platy substrate 19 made of, e.g., quartz glass and a sol-gel material 20 applied on the substrate 19 in a given thickness (as indicated by the alternate long and two-short dash line in FIG. 2).

The sol-gel material 20 preferably comprises at least either of organic/inorganic complexes respectively represented by the following formulae (1) and (2). More preferred is a mixture of at least either of the complexes with polyethylene glycol as a thickener.

$$R_n SiX'_{4-n} \quad (1)$$

In formula (1), R is a hydrocarbon group having 1 to 4 carbon atoms or an optionally substituted aryl group; X' is an alkoxy group or a halogen atom; and n is an integer of 1 or 2.

$$MX'_n \quad (2)$$

In formula (2), M is a metal atom selected from Si, Ti, Zr, and Al; X' is an alkoxy group or a halogen atom; and n is an integer of 3 or 4.

Especially preferred as the sol-gel material 20 is a silane-based material. This is because use of the silane-based sol-gel material 20 has the following advantages. Since the hydrolysis and polycondensation of the raw material proceed relatively slowly, the material can retain over a longer period a low-viscosity state which is required in press molding. Furthermore, the raw material represented by formula (1), having one or more organic chain substituents effective in maintaining a low viscosity, is a general material which is easily available at low cost.

The sol-gel material 20 used for this embodiment preferably has appropriate functional groups which, after molding and solidification, will show satisfactory releasability from other sol-gel materials. Examples of the functional groups include relatively lowly reactive groups such as methyl, ethyl, isopropyl, 3,3,3-trifluoropropyl and phenyl groups.

An explanation is given below on a procedure for producing a replica-molding die 11 with the die 10 and a procedure for producing a sol-gel composition with the replica-molding die 11.

First, a pressing machine is operated to bring the die 10 close to a sol-gel material 20 having functional groups such as methyl and press the molding surface 14 against the sol-gel material 20 through the release film 15 for a given time period at a given pressure while heating the sol-gel material 20 at a given temperature (hot forming). Subsequently, the molding die 10 is separated from the sol-gel material 20, which is then sintered to remove the solvent. (This heating may be conducted while keeping the die 10 in contact with the sol-gel material 20.)

The replica-molding die 11 thus produced from the sol-gel material 20 has a surface shape corresponding to the grooves 16 formed on the molding surface 14 (the surface shape is shown in FIG. 2 by a continuous line).

This replica-molding die 11 is used in press-molding another sol-gel material 20 to produce a sol-gel composition.

The sol-gel composition thus produced has a surface having the same shape and size as the molding surface 14 of the die 10, and is a replica of the molding die 10. (This replica was formed from a sol-gel material 20 having relatively lowly reactive functional groups like the material used for forming the replica-molding die 11. Consequently, the replica-molding die 11 could be easily separated from the replica after press molding, and the grooves 16 formed in the molding surface 14 of the molding die 10 were reproduced. A reflective coat of gold (Au) was vapor-deposited on this replica to evaluate the replica for diffraction efficiency. As a result, the replica was found to have a diffraction efficiency of 60% (wavelength, 1,550 nm), which was the same as that of the molding die 10.)

The embodiment described above produces the following effects. Since the molding die 10 has a release film 15 formed on the molding surface 14, it shows satisfactory releasability from a sol-gel material 20 in producing a replica-molding die 11. As a result, in the process for producing the replica-molding die 11, it is possible to attain a higher production rate, a lower rejection rate and better dimensional accuracy than conventional ones.

In particular, since the release film 15 of the molding die 10 is made of gold (Au), platinum (Pt), copper (Cu), palladium (Pd), silver (Ag), nickel (Ni) or an alloy of two or more thereof, the surface of the release film 15 is less apt to suffer a change, e.g., oxidation, over a prolonged period and shows excellent durability.

Furthermore, in this molding die 10, since the substrate 13 holding the release film 15 is made of one member selected from resins, glasses, metals and a combination of two or more thereof bonded to each other, the release film 15 can have a reduced thickness irrespective of the area of the molding surface 14.

Moreover, since the molding die 10 has a buffer layer 18 formed between the substrate 13 and the release film 15 (see FIG. 2), this molding die 10 is less apt to have the possibility that the release film 15 may peel off the substrate 13, as compared with the case in which the release film is formed directly on the substrate 13. As a result, the molding die 10 can have improved durability.

Since this molding die 10 has grooves 16 as recesses in the molding surface 14, it is possible to produce various optical parts such as read-only optical information recording media (CD-ROM), flat microlenses and grating elements.

This molding die 10 can be used as a master die, i.e., a model, for producing from a sol-gel material a replica-molding die 11 for use in producing such optical parts. Since this replica-molding die 11 is molded by pressing the molding die 10 having the constitution described above against a sol-gel material, it is possible to attain a higher production rate, a lower rejection rate and better dimensional accuracy than conventional ones.

According to the embodiment described above, the molding die 10 having the constitution described above is used to produce the replica-molding die 11, which in turn is used to produce a replica of the die 10. Consequently, the replica can has improved accuracy with respect to dimensions and shape as compared with conventional ones.

In particular, since a sol-gel material 20 having releasable functional groups is used in this embodiment, the functional groups form an outer layer of the replica-molding die 11 upon contact of the sol-gel material 20 with the release film 15. As a result, the die 10 can be easily separated from the replica-molding die 11 as a sol-gel composition. This effect is thought to be attributable to the fact that the functional groups are lowly reactive and relatively bulky and are hence apt to orient outward when the sol-gel material is polymerized.

Since the functional groups which have oriented outward form an outer layer, the replica-molding die 11 does not essentially necessitate a release film made of, e.g., gold (Au) or platinum (Pt) and has satisfactory releasability from other sol-gel materials 20. As a result, replica production can be conducted easily and smoothly.

When many replica-molding dies 11 are thus produced and used to mold sol-gel compositions, then these moldings can be utilized as a grating lens.

Figure 3:
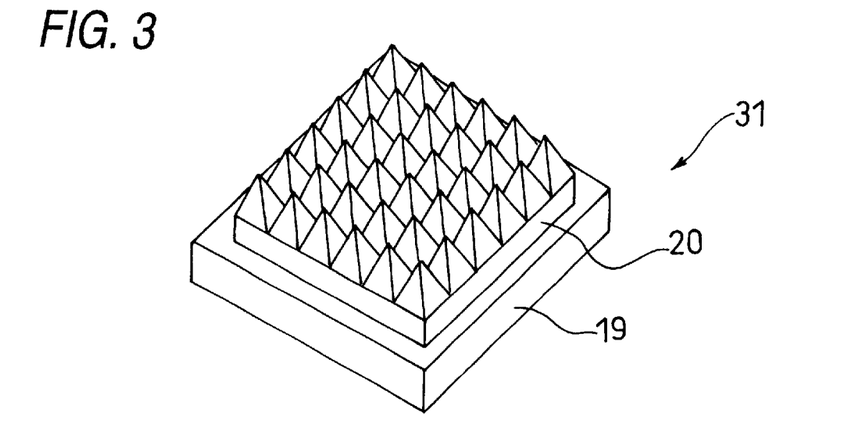
FIG. 3 is a slant view illustrating a modification example of the sol-gel composition.
Figure 4:
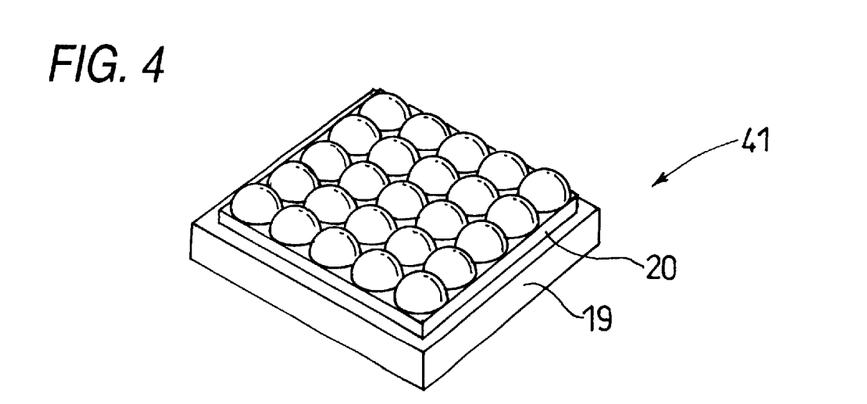
FIG. 4 is a slant view illustrating another modification example of the sol-gel composition.
Figure 5:
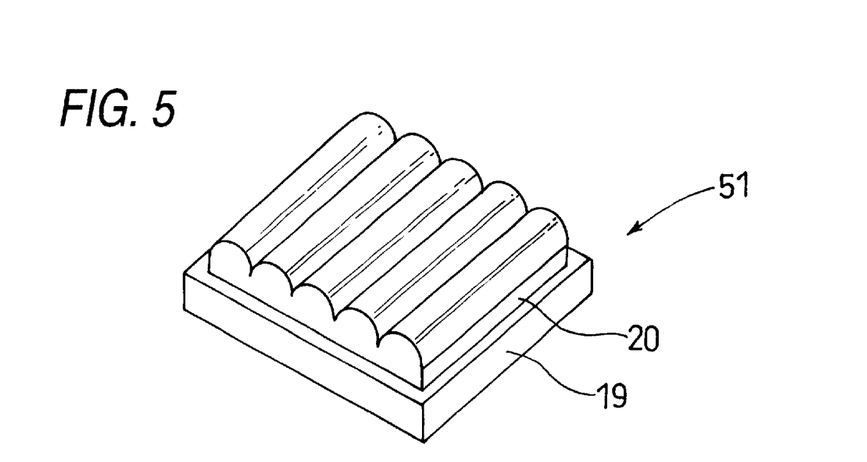
FIG. 5 is a slant view illustrating still another modification example of the sol-gel composition.

These replica-molding dies 31, 41 and 51 also can be utilized as a grating lens.

EXAMPLES

Molding die samples were produced which differed in substrate, release film, buffer layer, etc., with respect to material, film thickness, or deposition method or in as to whether a buffer layer was contained or not. These molding dies were used to produce sol-gel compositions.

These molding dies were evaluated for releasability and reproducibility and further evaluated comprehensively. The results of these evaluations, which will be explained below, are shown in Table 1.

TABLE 1

|  |  | Example 1 | Example 2 | Example 3 | Example 4 | Example 5 |
|---|---|---|---|---|---|---|
| Substrate |  | first substrate | second substrate | second substrate | first substrate | first substrate |
| Buffer layer | Material | ITO | (Al + oxide) Cr | (Al + oxide) — | none | none |
|  | Deposition method | sputtering | reactive sputtering |  |  |  |
| Release layer | Material | Au | Au | Au | Au | none |
|  | Deposition method | sputtering | vacuum deposition | reactive sputtering | sputtering |  |
| Releasability |  | ○ | ○ | Δ | Δ | × |
| Reproducibility |  | ○ | ○ | Δ | Δ | × |
| Comprehensive evaluation |  | ○ | ○ | Δ | Δ | × |

Besides being used for producing the replica-molding die 11 shown in FIGS. 1 and 2, the molding die 10 can be used for molding replica-molding dies 31, 41, and 51 shown in FIGS. 3 to 5, respectively, by imparting a suitably selected surface shape to the molding surface 14. (In FIGS. 3 to 5, numeral 19 denotes a platy substrate made of, e.g., quartz glass like the numeral 19 in FIGS. 1 and 2.)

The replica-molding die 31 shown in FIG. 3 is formed by forming a lattice pattern on the surface of a sol-gel material 20; this molding die 31 is molded with a molding die which is the same as the molding die 10 shown in FIGS. 1 and 2, except that grooves 16 of a lattice pattern is formed in the molding surface 14. The replica-molding die 41 shown in FIG. 4 is formed by forming many semispherical protrusions on the surface of a sol-gel material 20; this molding die 41 is molded with a molding die which is the same as the molding die 10 shown in FIGS. 1 and 2, except that semispherical recesses have been formed in the molding surface 14. The replica-molding die 51 shown in FIG. 5 is formed by forming many ridges each having a semicircular cross section on the surface of a sol-gel material 20; this molding die 51 is molded with a molding die which is the same as the molding die 10 shown in FIGS. 1 and 2, except that parallel grooves each having a semicircular cross section have been formed in the molding surface 14.

The molding die used for molding the replica-molding die 31 has, in the molding surface, many recesses each in a nearly quadrangularly pyramidal shape arranged in a matrix pattern. The molding die used for molding the replica-molding die 41 has, in the molding surface, many semispherical recesses arranged in a matrix pattern. Furthermore, the molding die used for molding the replica-molding die 51 has, in the molding surface, many grooves which each has a nearly semicircular cross section and are arranged in parallel with each other.

In producing each molding die, one of the first and second substrates described below was used.

The first substrate was produced in the following manner. A quartz glass plate coated with a metal film having high resistance to hydrofluoric acid was prepared. Fine through-holes were formed in the metal film through processing with a photoresist. Thereafter, the glass plate was etched by immersion in an aqueous hydrofluoric acid solution for a given time period, and the metal film was then removed. The first substrate thus produced had many fine recesses and protrusions on the surface.

The second substrate was a commercial product comprising a base made of quartz glass and a reflection type diffraction grating (made of resin) formed thereon. This commercial substrate was produced in the following manner. A glass plate whose surface had been finely roughened by an appropriate method, e.g., dry etching or interference exposure, was prepared. An epoxy resin was applied on a quartz glass base, and the fine roughness of the glass plate was transferred to the epoxy resin to produce a replica having a diffraction grating. The surface of this replica was coated with an aluminum (Al) layer and an oxide to form a protective layer.

Among the evaluation items shown in Table 1, releasability was evaluated through a test in which the molding die was pressed against a sol-gel material at a given pressure for a given time period and then examined as to whether the molding die could be easily and rapidly separated from the sol-gel material; the releasability was evaluated in three grades, i.e., ○ . . . good, Δ . . . practically usable, and X . . . unsuitable for practical use.

Reproducibility was evaluated through a test in which the recesses formed in the molding surface of the die were compared in shape and size with the diffraction grating or semispherical protrusions formed on the surface of the sol-gel composition; the reproducibility was evaluated in three grades, i.e., ○ . . . good, Δ . . . practically usable, and X . . . unsuitable for practical use.

With respect to comprehensive evaluation, properties other than releasability and reproducibility were taken in account, such as easiness of release film deposition, durability, corrosion resistance and heat resistance. The comprehensive evaluation was made in three grades, i.e., ○ . . . good, Δ . . . practically usable, and X . . . unsuitable for practical use.

Example 1

A 10 nm-thick film of a tin-doped indium oxide (ITO) was deposited as a buffer layer on the first substrate by sputtering. On this thin film was deposited a 20 nm-thick gold (Au) film as a release film by sputtering. Thus, a molding die was obtained. This molding die had a golden surface. When this molding die was held to the light of a fluorescent lamp, the lamp could be perceived through the thin tin-doped indium oxide (ITO) film and the thin gold (Au) film.

This molding die was used to mold flat microlenses as sol-gel compositions in the following manner.

A material for each flat microlens used was a soda-lime glass substrate coated with a 30 μm-thick film of a sol-gel material. This sol-gel material was one obtained by diluting a mixture of phenyltriethoxysilane and dimethyldiethoxysilane with ethyl alcohol, hydrolyzing the diluted silane compounds with an aqueous acid solution to obtain a coating fluid, and then heating the coating fluid to cause it to undergo sol-gel transformation.

In this Example 1, the molding surface of the molding die was examined beforehand with a microscope. The molding surface of the molding die was kept being pressed against the sol-gel material while heating the sol-gel material at 200° C. for 30 minutes with a hot plate to thereby cure the sol-gel material. The cured sol-gel material was cooled naturally, before the molding die was separated therefrom to produce a flat microlens. This operation for microlens production was conducted twice. The two flat microlenses produced using the molding die had on the surface thereof many semispherical protrusions each of a convex lens shape, which were attributable to the surface shape of the first substrate.

In producing each microlens, the molding die could be easily and rapidly separated from the sol-gel material.

After the first and second operations for flat microlens production, the molding surface of the molding die was examined with a microscope and compared with the state thereof before the flat microlens production. As a result, no abnormality was observed, and the release film was completely free from peeling or transfer.

In each of the two flat microlenses obtained in this Example 1, the semispherical protrusions had a height of 17 μm and a focal length of about 220 μm (wavelength, 633 nm). Namely, no difference in lens plane shape was observed between the two flat microlenses.

Consequently, the molding die obtained in this Example 1 was rated as "○" with respect to each of releasability, reproducibility and comprehensive evaluation.

Example 2

A thin chromium (Cr) film was deposited as a buffer layer by reactive sputtering on the diffraction grating formed on the second substrate. In this film deposition in which an oxygen plasma was used, an outermost surface layer of the diffraction grating was cleaned and converted to a thin oxide layer and, simultaneously therewith, oxidation of chromium (Cr) occurred. As a result, the thin chromium (Cr) film tenaciously adhered to the diffraction grating through a chromium (Cr) layer bonded in an oxide state and through a thin oxide layer.

Subsequently, a thin gold (Au) film was continuously deposited as a release film on the thin chromium (Cr) film under vacuum to obtain a molding die. Because this film deposition was conducted under vacuum, the gold (Au) as a release film tenaciously adhered to the thin chromium (Cr) film.

The molding die thus obtained was subjected 30 times to a pressing operation in which the molding surface of the molding die was pressed against a sol-gel material containing methyltriethoxysilane as the main component. Thus, many gel films each having a transferred diffraction grating were obtained. During these operations, the molding die was completely free from the peeling or transfer of the release film and could be easily and rapidly separated from the sol-gel material.

These gel films were heated to 350° C. Thereafter, a reflective gold (Au) coat having a reflectance of 82% (wavelength, 1,550 nm) was deposited thereon by sputtering to obtain sol-gel compositions.

These sol-gel compositions were examined for diffraction efficiency and examined with a microscope.

In the examination of diffraction efficiency, 1,550 nm laser light emitted from a variable-wavelength laser was caused to strike on the diffraction grating. The intensity of the resultant diffracted light was measured with a photodetector, and the amount of the light incident on the diffraction grating was measured with the same photodetector. The diffraction efficiency was evaluated by comparing these two found values.

As a result, the diffraction efficiency of primary diffracted light for the die was 61% (wavelength, 1,550 nm), while those for the diffraction gratings of the sol-gel compositions were in the range of from 58 to 75% (wavelength, 1,550 nm). It was thus found that the diffraction grating pattern had been transferred with good reproducibility.

On the other hand, the examination with a microscope revealed that the diffraction grating of the molding die had a pitch of 601 grooves or ridges per mm, while those of the sol-gel compositions each had a pitch of from 599 to 602 ridges or grooves per mm. It was thus found that the diffraction grating pattern had been transferred highly accurately.

Consequently, the molding die obtained in this Example 2 also was rated as "○" with respect to each of releasability, reproducibility and comprehensive evaluation.

Example 3

A thin gold (Au) film was deposited by reactive sputtering on the diffraction grating formed on the second substrate, without forming a buffer layer. Thus, a molding die was obtained. Using this molding die, the same operation for producing a flat microlens as in Example 1 was conducted many times.

This molding die was satisfactory in releasability and producibility throughout tens of operations of the flat microlens production from the first operation. Thereafter, however, part of the thin gold (Au) film peeled off the protective (buffer) layer, composed of an aluminum (Al) layer and an oxide layer, formed beforehand on the second substrate, and adhered to the flat microlens, resulting in considerably reduced releasability.

On the flat microlenses produced after those tens of operations was deposited an antireflection coat (porous silica ($SiO_2$) film) so as to cover the thin gold (Au) film adherent to the lens surface. These coated microlenses were washed. As a result, the antireflection coat peeled off together with the thin gold (Au) film, and the flat microlenses thus became unusable.

Furthermore, the molding die in which the thin gold (Au) film had partly peeled off was used to conduct press molding. As a result, the die showed significantly impaired releasability. Because of the difficulty in separation, the molding die was forcibly peeled from the flat microlens. As a result, part of the sol-gel material remained adherent to the molding surface of the molding die, resulting in a reject.

Consequently, the molding die obtained in this Example 3 was rated as "Δ" with respect to each of releasability, reproducibility and comprehensive evaluation.

Example 4

A 20 nm-thick gold (Au) film was deposited as a release film by sputtering on the first substrate without forming a buffer layer. Thus, a molding die was obtained. Using this molding die, the same operation for producing a flat microlens as in Example 1 was conducted many times.

This molding die was satisfactory in releasability and reproducibility throughout several operations of the flat microlens production from the first operation. In the tenth and subsequent operations, however, part of the thin gold (Au) film peeled off the substrate and adhered to the flat microlens, resulting in considerably reduced releasability.

In these flat microlenses, the many semispherical protrusions formed on the surface had a height of 17 $\mu$m. Although reproducibility could be thus maintained, the flat microlenses had reduced light transmission due to the adhesion of a thin gold (Au) film and could not perform the desired function as a lens.

Furthermore, the die in which the thin gold (Au) film had partly peeled off was used to continuously mold flat microlenses. As a result, the molding die showed significantly impaired releasability. Because of the difficulty in separation, the molding die was forcibly peeled from the flat microlens. As a result, part of the sol-gel material remained adherent to the molding surface of the molding die, resulting in a reject.

Consequently, the molding die obtained in this Example 4 was rated as "Δ" with respect to each of releasability, reproducibility and comprehensive evaluation.

Example 5 (Comparative Example)

Using the first substrate as a molding die, the same operation for producing a flat microlens as in Example 1 was conducted several times. Since this molding die had poor releasability, it was forcibly peeled from the flat microlens. As a result, part of the sol-gel material remained adherent to the molding surface of the molding die, resulting in a reject.

Consequently, the molding die of this Example 5 was rated as "X" with respect to each of releasability, reproducibility and comprehensive evaluation.

The results obtained in Examples 1 to 5 show the following. The molding dies obtained in Examples 1 to 4 had better releasability from sol-gel materials than the molding die of Example 5 (Comparative Example) when the number of repetitions of sol-gel composition molding was not larger than a given value, because the molding surface of each of the molding dies of Examples 1 to 4 had a thin gold (Au) film as a release film.

The molding dies obtained in Examples 1 and 2 were superior in durability of the thin gold (Au) film to that obtained in Example 3 because the former dies had a buffer layer formed between the substrate and the release film.

In particular, the molding die obtained in Example 2 had even higher durability of the thin gold (Au) film than that obtained in Example 1 because the buffer layer deposited in Example 2 was a thin chromium (Cr) film.

Example 6

In this Example, a sol-gel composition which was the same as those obtained in Example 2 except that deposition of the reflective gold (Au) coat was omitted was used as a molding die (replica-molding die) in the following manner.

A sol-gel composition (having no reflective gold coat) obtained with the molding die produced in Example 2 was used as a molding die to press-mold a gel film having the same composition as in Example 2 (containing methyltriethoxysilane as the main component). After the press molding, the stamper could be easily separated from the molded film. As a result, the molded film had a transferred diffraction grating having the same pitch (600 grooves or ridges per mm) as the original diffraction grating.

On the diffraction grating thus obtained was vapor-deposited a reflective gold coat in the same manner as in Example 2. The coated diffraction grating was evaluated for diffraction efficiency. As a result, the diffraction efficiency of primary diffracted light was 60% (wavelength, 1,550 nm), like those for the diffraction gratings obtained in Example 2. It was thus found that the diffraction grating pattern had been transferred with good reproducibility.

The molding die used in this Example 6 also was rated as "○" with respect to each of releasability, reproducibility and comprehensive evaluation.

The invention should not be construed as being limited to Examples 1 to 4 and 6 given above. The sol-gel composition, molding surface, release film, substrate, buffer layer, recesses, functional groups and others shown in the embodiments described above are not particularly limited in material, shape, size, constitution, number, position, property, thickness, deposition method, proportion, etc., as long as the invention is achieved.

As described above, the invention brings about the following effects. Since the molding die of the invention has a release film on the molding surface to be brought into contact with a sol-gel material, it shows satisfactory releasability from the sol-gel material. Consequently, a higher production rate, a lower rejection rate, and better dimensional accuracy than conventional ones can be attained.

In a preferred embodiment of the molding die of the invention, the release film is made of a material comprising one member selected from the group consisting of gold (Au), platinum (Pt), copper (Cu), palladium (Pd), silver (Ag), nickel (Ni) and alloys of two or more thereof. Consequently, the molding surface is less apt to suffer a change with the lapse of time, e.g., oxidation. As a result, excellent durability is obtained.

In another preferred embodiment of the molding die of the invention, the die has a substrate for the release film, and the substrate is made of a material comprising one member selected from the group consisting of resins, glasses, metals and a combination of two or more thereof bonded to each other. Consequently, the release film can have a reduced thickness irrespective of the area of the molding surface.

In a further preferred embodiment of the molding die of the invention, the molding die has a buffer layer made of one or more metals and/or one or more inorganic oxides between the substrate and the release film. Consequently, compared to molding dies having a release film directly deposited on a substrate, this die is less apt to have the possibility that the release film may peel off the substrate, i.e., may be transferred to a sol-gel material. As a result, the molding die can have improved durability.

In still a further preferred embodiment of the molding die of the invention, the surface of the release film has recesses. Consequently, it is possible to use the molding die to produce various optical parts, e.g., read-only optical information recording media (CD-ROM), flat microlenses, and grating elements.

The sol-gel composition of the invention is molded by pressing any of the dies according to the invention described above against a sol-gel material. Consequently, a higher production rate, a lower rejection rate and better dimensional accuracy than conventional ones can be attained.

The process of the invention for producing a sol-gel composition comprises using the sol-gel composition according to the invention as a molding die for molding a sol-gel material. Consequently, a replica having higher dimensional accuracy than conventional ones can be obtained.

In a preferred embodiment of the process for producing a sol-gel composition of the invention, the sol-gel composition used as a molding die has functional groups which are releasable from the sol-gel material. Consequently, the sol-gel composition for use as a molding die has satisfactory releasability from the release film because the functional groups form an outer layer of the sol-gel composition upon contact with the release film.

What is claimed is:

1. A molding die to be pressed against a sol-gel material for producing a sol-gel composition, said molding die comprising a release film formed on the molding surface thereof to be brought into contact with the sol-gel material, said molding die further comprising a substrate for the release film, said substrate being made of a material comprising at least one member selected from the group consisting of resins, glasses, metals and a combination of two or more thereof bonded to each other and a buffer layer made of one or more metals and/or one or more inorganic oxides between the substrate and the release film, wherein the release film is made of a material comprising gold (Au) and where the surface of the release film has recesses.

2. A molding die to be pressed against a sol-gel material for producing a sol-gel composition, said molding die comprising a release film formed on the molding surface thereof to be brought into contact with the sol-gel material, wherein the release film is made of a material comprising at least one member selected from the group consisting of gold (Au), platinum (Pt), copper (Cu), palladium (Pd), silver (Ag), nickel (Ni) and alloys of two or more thereof, the surface of the release film has recesses, and said molding die further comprising a substrate for the release film, said substrate being made of a material comprising at least one member selected from the group consisting of resins, glasses, metals and a combination of two or more thereof bonded to each other and further a buffer layer made of one or more metals and/or one or more inorganic oxides between the substrate and the release film, wherein said buffer layer has a multilayer structure.

3. A molding die in accordance with claim 2, wherein said multilayer structure is composed of an aluminum (Al) layer having a thickness of 100 nm, a silica (Si) layer having a thickness of 280 nm disposed on said aluminum layer, a layer of titania ($TiO_2$) having a thickness of 170 nm disposed on said silica layer, and a chromium or tin doped indium oxide layer disposed on said titania layer.

4. A molding die in accordance with claim 2, wherein the release film is made of gold (Au).

* * * * *